United States Patent
Lash et al.

(10) Patent No.: US 8,037,492 B2
(45) Date of Patent: Oct. 11, 2011

(54) METHOD AND SYSTEM FOR VIDEO ENHANCEMENT TRANSPORT ALTERATION

(75) Inventors: Todd Lash, Oakland, CA (US); Daniel Salo, Novato, CA (US); Jay Weber, Menlo Park, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 1062 days.

(21) Appl. No.: 09/954,144

(22) Filed: Sep. 12, 2001

(65) Prior Publication Data
US 2002/0108128 A1   Aug. 8, 2002

Related U.S. Application Data

(60) Provisional application No. 60/232,050, filed on Sep. 12, 2000.

(51) Int. Cl.
 H04N 7/10 (2006.01)
 H04N 7/025 (2006.01)
 H04N 7/173 (2011.01)
(52) U.S. Cl. ............... 725/36; 725/51; 725/91; 725/93
(58) Field of Classification Search ................ 725/109, 725/111, 112, 113, 114, 116, 117, 91, 93, 725/46
See application file for complete search history.

(56) References Cited

U.S. PATENT DOCUMENTS

| 4,400,724 A | 8/1983 | Fields |
| 4,573,072 A | 2/1986 | Freeman |
| 4,602,279 A | 7/1986 | Freeman |
| 4,847,698 A | 7/1989 | Freeman |
| 4,907,322 A | 3/1990 | Kanno |
| 4,918,516 A | 4/1990 | Freeman |
| 5,136,633 A | 8/1992 | Tejada |
| 5,202,054 A | 4/1993 | Suzuki |
| 5,220,501 A | 6/1993 | Lawlor |
| 5,347,632 A | 9/1994 | Filepp |
| 5,424,770 A * | 6/1995 | Schmelzer et al. ............ 725/36 |
| 5,534,911 A | 7/1996 | Levitan |
| 5,537,141 A | 7/1996 | Harper |

(Continued)

FOREIGN PATENT DOCUMENTS
EP   0 332 707 A1   9/1989
(Continued)

OTHER PUBLICATIONS

Lepley, K., "WebTV Networks Introduces Revolutionary Next-Generation System," Sep. 16, 1997, XP002101851, 2 pages, http://webtv.net/company/media_center/webtvplus.html. Simonson, et al. "Version Augmented URIs for Reference Permenencevia an Apache Module Design," Computer Networks and ISDN Systems, NL, North Holland Publishing, Amsterdam, vol. 30, No. 1-7, Apr. 1998, pp. 337-345.
Rio, et al. "A Framework for Broadcasting and Management of URIs," Computer Networks and IDSN Systems, NL, North Holland Publishing. Amsterdam, vol. 28, No. 4, Feb. 1, 1996, pp. 535-542.
Zigmond, et al. "Linking Television to the Internet: EIA-746 and Beyond" Web Television Networks., IEEE, 1998, pp. 282-283.
"Interactive Television & WebTV Plus", Oct. 16, 1998, from http://developer.webtv.net/docs/ITV/ITV.html.

(Continued)

*Primary Examiner* — Kristine Kincaid
*Assistant Examiner* — Omar S Parra
(74) *Attorney, Agent, or Firm* — Robert D. Shedd; Vincent E. Duffy; Joel M. Fogelson

(57) ABSTRACT

Disclosed is a system for selective modification of transport data for enhanced video content. Video transport data is received in a video signal or an external source and a configurable processor uses criteria to selectively modify units of the video transport data. Disclosed criteria included a rule based pattern matching/replacement as well as criteria for denial, acceptance, or modification of particular units of video transport data. The modified video transport data stream created by the processor can be re-encoded in the video signal and provided to an external monitor.

39 Claims, 3 Drawing Sheets

U.S. PATENT DOCUMENTS

| | | | |
|---|---|---|---|
| 5,578,181 A | 11/1996 | Hirose | |
| 5,585,858 A | 12/1996 | Harper | |
| 5,632,007 A | 5/1997 | Freeman | |
| 5,664,110 A | 9/1997 | Green | |
| 5,682,196 A | 10/1997 | Freeman | |
| 5,686,902 A | 11/1997 | Reis et al. | |
| 5,708,845 A | 1/1998 | Wistendahl | |
| 5,710,887 A | 1/1998 | Chelliah | |
| 5,715,403 A | 2/1998 | Stefik | |
| 5,724,091 A | 3/1998 | Freeman | |
| 5,740,549 A | 4/1998 | Reilly | |
| 5,742,759 A | 4/1998 | Nessett | |
| 5,745,360 A | 4/1998 | Leone | |
| 5,745,681 A | 4/1998 | Levine | |
| 5,751,956 A | 5/1998 | Kirsch | |
| 5,758,057 A | 5/1998 | Baba | |
| 5,760,838 A | 6/1998 | Adams | |
| 5,761,606 A | 6/1998 | Wolzien | |
| 5,770,844 A | 6/1998 | Henn | |
| 5,774,664 A | 6/1998 | Hidary et al. | |
| 5,774,666 A | 6/1998 | Portuesi | |
| 5,774,670 A | 6/1998 | Montulli | |
| 5,778,181 A | 7/1998 | Hidary | |
| 5,790,935 A | 8/1998 | Payton | |
| 5,794,207 A | 8/1998 | Walker | |
| 5,812,769 A | 9/1998 | Graber | |
| 5,812,776 A | 9/1998 | Gifford | |
| 5,818,441 A | 10/1998 | Throckmorton | |
| 5,818,935 A | 10/1998 | Maa | |
| 5,822,018 A * | 10/1998 | Farmer | 348/705 |
| 5,832,223 A | 11/1998 | Hara et al. | |
| 5,848,396 A | 12/1998 | Gerace | |
| 5,857,190 A | 1/1999 | Brown | |
| 5,861,881 A * | 1/1999 | Freeman et al. | 715/500.1 |
| 5,862,339 A | 1/1999 | Boñnaure | |
| 5,864,604 A | 1/1999 | Moen | |
| 5,864,823 A | 1/1999 | Levitan | |
| 5,892,900 A | 4/1999 | Ginter | |
| 5,897,622 A | 4/1999 | Blinn | |
| 5,910,987 A | 6/1999 | Ginter | |
| 5,929,849 A | 7/1999 | Kikinis | |
| 5,931,906 A | 8/1999 | Fidelibus, Jr. et al. | |
| 5,960,411 A | 9/1999 | Hartman | |
| 5,963,915 A | 10/1999 | Kirsch | |
| 5,964,829 A | 10/1999 | Ozden | |
| 5,970,469 A | 10/1999 | Scroggie | |
| 5,970,472 A | 10/1999 | Allsop | |
| 5,978,013 A * | 11/1999 | Jones et al. | 725/23 |
| 5,978,780 A | 11/1999 | Watson | |
| 5,978,817 A | 11/1999 | Giannandrea | |
| 5,987,509 A | 11/1999 | Portuesi | |
| 6,012,080 A | 1/2000 | Ozden | |
| 6,016,504 A | 1/2000 | Arnold | |
| 6,016,509 A | 1/2000 | Dedrick | |
| 6,018,768 A | 1/2000 | Ullman | |
| 6,036,601 A | 3/2000 | Heckel | |
| 6,044,469 A | 3/2000 | Horstmann | |
| 6,064,438 A | 5/2000 | Miller | |
| 6,070,191 A | 5/2000 | Narendran | |
| 6,081,830 A | 6/2000 | Schindler | |
| 6,097,441 A | 8/2000 | Allport | |
| 6,108,706 A | 8/2000 | Birdwell | |
| 6,131,086 A | 10/2000 | Walker | |
| 6,141,694 A | 10/2000 | Gardner | |
| 6,154,738 A | 11/2000 | Call | |
| 6,154,771 A | 11/2000 | Rangan | |
| 6,157,377 A | 12/2000 | Shah-Nazaroff | |
| 6,167,378 A | 12/2000 | Webber, Jr. | |
| 6,177,931 B1 | 1/2001 | Alexander et al. | |
| 6,178,376 B1 | 1/2001 | Maquaire | |
| 6,182,052 B1 | 1/2001 | Fulton | |
| 6,189,785 B1 | 2/2001 | Lowery | |
| 6,202,054 B1 | 3/2001 | Lawlor | |
| 6,216,157 B1 | 4/2001 | Vishwanath | |
| 6,240,555 B1 | 5/2001 | Shoff | |
| 6,282,517 B1 | 8/2001 | Wolfe | |
| 6,282,713 B1 | 8/2001 | Kitsukawa | |
| 6,286,045 B1 | 9/2001 | Griffiths | |
| 6,296,185 B1 | 10/2001 | Dejaeger | |
| 6,301,619 B1 | 10/2001 | Segman | |
| 6,317,881 B1 | 11/2001 | Shah-Nazaroff et al. | |
| 6,321,209 B1 | 11/2001 | Pasquali | |
| 6,338,094 B1 | 1/2002 | Scott | |
| 6,339,826 B2 | 1/2002 | Hayes, Jr. | |
| 6,373,950 B1 | 4/2002 | Rowney | |
| 6,374,237 B1 | 4/2002 | Reese | |
| 6,394,341 B1 | 5/2002 | Mäkipaa | |
| 6,401,077 B1 | 6/2002 | Godden | |
| 6,401,085 B1 | 6/2002 | Gershman | |
| 6,420,555 B1 | 7/2002 | Dong | |
| 6,424,714 B1 | 7/2002 | Wasilewski et al. | |
| 6,446,109 B2 | 9/2002 | Gupta | |
| 6,460,180 B1 | 10/2002 | Park et al. | |
| 6,470,386 B1 | 10/2002 | Combar | |
| 6,493,763 B1 | 12/2002 | Suzuki | |
| 6,502,243 B1 * | 12/2002 | Thomas | 725/110 |
| 6,520,409 B1 | 2/2003 | Mori | |
| 6,539,545 B1 | 3/2003 | Dureau et al. | |
| 6,539,548 B1 | 3/2003 | Hendricks et al. | |
| 6,560,777 B2 * | 5/2003 | Blackketter et al. | 725/110 |
| 6,567,984 B1 | 5/2003 | Allport | |
| 6,571,390 B1 | 5/2003 | Dunn et al. | |
| 6,571,392 B1 | 5/2003 | Zigmond | |
| 6,598,027 B1 | 7/2003 | Breen, Jr. | |
| 6,604,135 B1 | 8/2003 | Rogers | |
| 6,697,792 B2 | 2/2004 | Bunney | |
| 6,698,020 B1 * | 2/2004 | Zigmond et al. | 725/34 |
| 6,766,524 B1 | 7/2004 | Matheny et al. | |
| 6,772,435 B1 | 8/2004 | Thexton et al. | |
| 6,795,973 B1 * | 9/2004 | Estipona | 725/136 |
| 6,807,675 B1 | 10/2004 | Maillard | |
| 6,820,277 B1 | 11/2004 | Eldering et al. | |
| 6,828,775 B2 | 12/2004 | Chow et al. | |
| 6,832,388 B1 * | 12/2004 | Du Val | 725/110 |
| 6,889,385 B1 * | 5/2005 | Rakib et al. | 725/119 |
| 6,895,392 B2 | 5/2005 | Stefik et al. | |
| 6,898,570 B1 | 5/2005 | Tedesco | |
| 6,898,762 B2 | 5/2005 | Ellis | |
| 6,976,090 B2 | 12/2005 | Ben-Shaul | |
| 7,039,933 B1 | 5/2006 | Chen et al. | |
| 7,047,302 B1 | 5/2006 | Chatani et al. | |
| 7,076,467 B1 | 7/2006 | Chatani et al. | |
| 7,174,562 B1 * | 2/2007 | Leak et al. | 725/110 |
| 7,181,412 B1 | 2/2007 | Fulgoni | |
| 7,206,756 B1 | 4/2007 | Walsky | |
| 7,222,155 B1 * | 5/2007 | Gebhardt et al. | 709/204 |
| 7,237,251 B1 | 6/2007 | Oz et al. | |
| 7,313,806 B1 | 12/2007 | Williams et al. | |
| 7,360,232 B2 | 4/2008 | Mitchell | |
| 7,395,546 B1 | 7/2008 | Asmussen | |
| 7,478,414 B1 | 1/2009 | Glusker et al. | |
| 7,657,920 B2 | 2/2010 | Arseneau et al. | |
| 2001/0020242 A1 | 9/2001 | Gupta | |
| 2001/0030624 A1 | 10/2001 | Schwoegler | |
| 2001/0030664 A1 | 10/2001 | Shulman | |
| 2001/0037500 A1 * | 11/2001 | Reynolds et al. | 725/36 |
| 2001/0056460 A1 | 12/2001 | Sahota | |
| 2002/0010798 A1 | 1/2002 | Ben-Shaul et al. | |
| 2002/0010922 A1 | 1/2002 | Darin | |
| 2002/0029291 A1 | 3/2002 | Crandall | |
| 2002/0057286 A1 * | 5/2002 | Markel et al. | 345/704 |
| 2002/0095676 A1 | 7/2002 | Knee et al. | |
| 2002/0188532 A1 | 12/2002 | Rothstein | |
| 2002/0188706 A1 | 12/2002 | Richards et al. | |
| 2002/0194215 A1 | 12/2002 | Cantrell et al. | |
| 2003/0005463 A1 | 1/2003 | Macrae | |
| 2003/0149938 A1 | 8/2003 | McElfresh et al. | |
| 2003/0204854 A1 | 10/2003 | Blackketter et al. | |
| 2004/0010372 A1 | 1/2004 | Schwoegler | |
| 2005/0138657 A1 | 6/2005 | Leftwich | |
| 2005/0283792 A1 | 12/2005 | Swix et al. | |
| 2006/0106681 A1 | 5/2006 | Shafron et al. | |
| 2006/0212921 A1 * | 9/2006 | Carr | 725/136 |
| 2007/0162951 A1 | 7/2007 | Rashkovskiy et al. | |
| 2008/0077478 A1 | 3/2008 | Kim | |
| 2008/0097830 A1 | 4/2008 | Kim | |

FOREIGN PATENT DOCUMENTS

| | | |
|---|---|---|
| EP | 598823 | 12/1994 |
| EP | 0 849 946 A2 | 6/1998 |
| EP | 0 915 612 A2 | 5/1999 |
| EP | 0 915 621 A2 | 5/1999 |
| EP | 0 917 380 A2 | 5/1999 |
| EP | 915612 | 5/1999 |
| EP | 810790 | 10/1999 |
| GB | 2 340 276 A | 2/2000 |
| GB | 2340276 A | 2/2000 |
| JP | 10-91512 A | 4/1998 |
| JP | 10-177532 A | 6/1998 |
| JP | 10-257455 A | 9/1998 |
| WO | WO 96/13124 | 5/1996 |
| WO | WO9613124 | 5/1996 |
| WO | WO9733434 | 9/1997 |
| WO | WO9738529 | 10/1997 |
| WO | WO9741654 | 11/1997 |
| WO | WO9741960 A | 11/1997 |
| WO | WO9747143 | 12/1997 |
| WO | WO 98/17064 | 4/1998 |
| WO | WO9817064 | 4/1998 |
| WO | WO9747143 | 5/1998 |
| WO | WO9827441 | 6/1998 |
| WO | WO9828541 | 6/1998 |
| WO | 98/53611 A1 | 11/1998 |
| WO | WO 99/35845 | 7/1999 |
| WO | WO9935845 | 7/1999 |
| WO | 00/42768 A1 | 7/2000 |
| WO | WO 02/058399 A1 | 7/2002 |
| WO | WO02058399 | 7/2002 |

OTHER PUBLICATIONS

"Interactive Television Programming Examples", Oct. 8, 1998, from http://developer.webtv.net/docs/ITV/examplest.html.

"Embedding and Overlaying Web Pages in a TV Broadcast", Oct. 8, 1998, from http://developer.webtv.net/docs/ITV/draft-zigmond-tv-url.00.txt.

"RFC 2838—Uniform Resource Identifiers for Television Broadcasts", May 2000, from http://www.faqs.org/rfcs/rfc2838.html.

"Interactive Television Links", Oct. 16, 1998, from http://developer.webtv.net/docs/ITV/links.html.

Lepley, K "WebTV Networks Introduces It's Revolutionary Next-Generation System—WebTv Plus", Sep. 16, 1997 from http://www.ncns.com/news/997/wtv-plus.html.

Wugofski, T. "A Modular Hypertext Markup Language for Broadcast Applications", Oct. 1, 1998 from http://toocan.philabs.research.philips.com/misc/atsc/bhtml/bhtml$_{13}$4.

Backer. G. et al. "A Framework for Interactive Television Based on Internet Standards", printed Jun. 28, 2000 from http://www.atvef.com/library/9806_framework.html.

"Enhanced Content Specification" from the Advanced Television Enhancement Forum, printed Jun. 28, 2000 from http://www.atvef.com/library/spec1_1a.html.

* cited by examiner

US 8,037,492 B2

METHOD AND SYSTEM FOR VIDEO ENHANCEMENT TRANSPORT ALTERATION

This application claims the benefit of U.S. Provisional Application No. 60/232,050 filed Sep. 12, 2000.

RELATED SUBJECT MATTER

Subject matter in this application may be used in conjunction with subject matter described in a disclosure entitled "A Method, Apparatus, And System for Overlapping Enhancement Control" which is attached hereto as Annex A and which is incorporated herein in its entirety by this reference.

FIELD

Features in the disclosure relate generally to systems for interactive video and more particularly to integration of video with internet-based enhancements.

BACKGROUND

An increasingly popular set of technologies for interactive video involves encoding Uniform Resource Locators ("URLs") in a video signal that is distributed to viewers, for instance, via broadcast. A view with an integrated video receiver and HTTP client may then enjoy an interactive enhanced video production through an HTTP session based on the URLs encoded in the video production.

A video production typically passes through several levels of a distribution hierarchy before being provided to the viewer. At each level, the entity typically has the right to control portions of the video production for enhanced video transport. For entities in the distribution hierarchy, and others such as broadcasters and viewers, it would be desirable for a means to exist that allowed for practical arrangements to be made to control enhanced video transport portions of the video production. It is possible to simply remove all enhanced video transport, however this precludes video enhancements and denies their benefits. It would also be beneficial for a tool to exist that allowed for the intelligent and selective modification of enhanced video transport data in a video production. Such an ability would allow entities in the video distribution hierarchy capability perform agreements respecting the content of the enhanced video transport and further prevent unauthorized distribution enhanced video transport.

Conventional technology provides an inadequate degree of control over units of video transport data. Some existing devices, e.g. closed captioning encoders, are directed towards encoding an additional data program (closed caption information) to accompany a video program. Others have the ability to write a closed captioning data program from a first channel on a second channel. The existing devices provide no mechanism for selective modification of unites of video transport data. A method of providing this type of control is highly desirable for entities in the distribution hierarchy and operators of server systems providing enhancements, for instance, because of the greater degree of control it could provide.

The greater control server system operators have over URLs in the video program, the better able they are to provide desired interactive enhancing resources. At a minimum, it is desirable there be some coordination between the URL stream encoded in the video program and the server system operator. However, with conventional techniques, coordination can be difficult, and in some instances, impossible. With conventional techniques, there is, at a minimum, a time a lag between the time of encoding the URLs and distribution to viewers (and the accompanying requests for enhancing resources). It would be desirable for a means to exist allowing server operators on-line and near real-time control over data for enhancing resources in a video production near the time of distribution to viewers.

SUMMARY

In order to provide a solution to the forgoing and additional problems, aspects the present invention provide a method and system for video enhancement transport alteration.

One aspect of the invention are computer-controlled methods for selectively encoding video transport data. An illustrative method includes receiving a video signal and a video transport data stream. The video transport data stream is selectively modified forming a modified video transport data stream. The modified video transport data stream is combined with a video signal, forming an output video signal. The output video signal is provided, where it can undergo later use. In a variation, the video transport data stream is encoded in the video signal. Yet another variation involves receiving the stream of enhanced video transport data across a data network from a remote source; the data network could include a portion of the internet. In yet another variation, selectively modifying the video transport data stream includes detecting a first video transport data unit. A rule with a condition portion and an action portion is examined for determining whether the first video transport data unit satisfies the condition portion. The action portion executes for modifying the video transport data stream when the condition matches. The first video transport data unit can include a URL, an attribute associated with a URL, ATVEF Transport B data, or other data associated with the video signal.

Actions that could be taken by a rule include, for instance, allowing the first video transport data unit to be encoded in the modified video transport data stream, preventing the first video transport data unit from being encoded in the modified enhanced video transport data stream, encoding a second video transport data unit in lieu of the first video transport data unit, or generating a notification of the encoded or modified video transport data stream.

In another variation, the video signal also includes closed captioning information. In this instance, a further feature includes extracting the closed caption information and the video transport data stream from the video signal and reencoding the closed caption information in the video signal in near real-time for retaining synchronization of the closed caption information and the video signal.

The video signal can include a vertical blanking interval and the video transport data be encoded in the vertical blanking interval. The video signal could be, for instance, encoded in an MPEG format, a Serial Digital Video format, as a Synchronized Multimedia Integration Language presentation, or as a streaming media type. Also, the modified video transport data stream could be provided to a remote monitoring client system.

In another variation, selectively modifying the video transport data stream includes inserting an identifier of a video program enhancement. Then, in this variation, the video signal is received at a plurality of receiver locations and the identifier detected. This variation could also include receiving information from the one or more of the receiver locations detecting the identifier and preparing summary information regarding the video program enhancement based on the information. The information could be supplemented by information received by an enhancing resource server system receiving requests for enhancements. The summary information could also be based on this.

Yet another aspect of the invention are systems for video enhancement transport alteration. An illustrative system includes an input for receiving a video transport data stream and an encoder for encoding a modified video transport data stream in an output video signal. This system also includes a video transport data modification processor. It is operatively coupled with the encoder, and the input, and is configured for receiving a video transport data stream from the input. The video transport data modification processor selectively modifies the enhanced video transport data stream for creating the modified video transport data stream, and provides the modified video transport data stream to the encoder.

In a variation, this system further includes a decoder for receiving an input video signal where the input video signal includes a video transport data stream and the decoder is configured for extracting the video transport data stream. In another variation, the video transport data modification processor includes a set of rules (having a condition portion and an action portion) and a pattern matching module. The pattern matching module identifies whether a video transport data unit in the enhanced video transport data stream matches the condition portions of members of the set of rules. The video transport data unit could include, for instance, a URL, an attribute of a URL or ATVEF Transport B data.

Yet another aspect of this system involves the encoder encoding identifiers of a video program enhancement. This system also includes a receiver network where the receiver network is configured for detecting the predetermined identifiers in a broadcast of the output video signal. This system could also include a server system configured for receiving a requests for a resource associated with an identifier in the modified video transport data stream, where the request includes one of the identifiers. An additional aspect of this system could include a data processing system for generating summary reports responsive to receiving the identifiers—either from just the output video signal or the output video signal and the received requests.

Another variation on the illustrative system involves adding a computer system configured for providing an video transport data stream to the input across the data network. In another variation, an output is added for providing the enhanced video transport data stream to a data network; and a monitoring computer system configured for receiving the modified video transport data stream across the data network is also added.

BRIEF DESCRIPTION OF THE DRAWINGS

These and other features, aspects, and advantages of the present invention will become better understood with regard to the following description, appended claims, and accompanying drawings where:

DETAILED DESCRIPTION

Operating Environment

Features of the invention operate in connection with systems for video having associated enhancing resources. In some embodiments, the enhancing resources (the term "enhancement" is used interchangeably herein) are provided through an internet-based response network. The viewer (client) side of the response network typically involves a device that incorporates a television receiver with a Hypertext Transfer Protocol ("HTTP") client (or "web browser") and logic for rendering a video image incorporating both a telecast and enhancing resources received by the HTTP client. Many such devices are commercially available.

Given its ubiquity, the most common form of enhanced video is enhanced television. One standard for the transport of data for enhancing resources has been promulgated by the Advanced Television Enhancement Forum ("ATVEF") of El Dorado Springs, Colo. See Enhanced Content Specification, Advanced Television Enhancement Forum (the "ATVEF Specification"). It is contemplated that enhanced video transmitted over networks using the Internet Protocol will grow in popularity, and features of the invention could be implemented in such an environment.

The ATVEF Specification defines two mechanisms for the transport of data for enhancing resources in connection with a video signal. The first mechanism ("ATVEF Transport A") involves the transport of real-time triggers which include a Uniform Resource Location ("URL"), optional Attribute-Value pairs, and an optional checksum. The second mechanism ("ATVEF Transport B") involves the delivery of both triggers and enhancing resource data as part of the video signal. ATVEF Transport A is for delivery of triggers by a forward path and the pulling of data by a return path (typically a portion of the Internet). ATVEF Transport B is for delivery of triggers and data by the forward path where the return path is optional.

Illustrative embodiments of the invention operate in connection with video productions including transport data for enhanced content ("video transport data"). In some embodiments, video transport data is conforming to the ATVEF Specification—either ATVEF Transport A or ATVEF Transport B could be used.

Depending on the transport mechanism, the meaningful video transport data unit may vary. In some embodiments it could be a trigger, in others a packet, in others delimited by start/stop indicators, in others a predetermined number of bits, and in still others based on time unit. A collection of successive video transport data units forms a video transport data stream.

DESCRIPTION OF FIGURES

Figure 1:
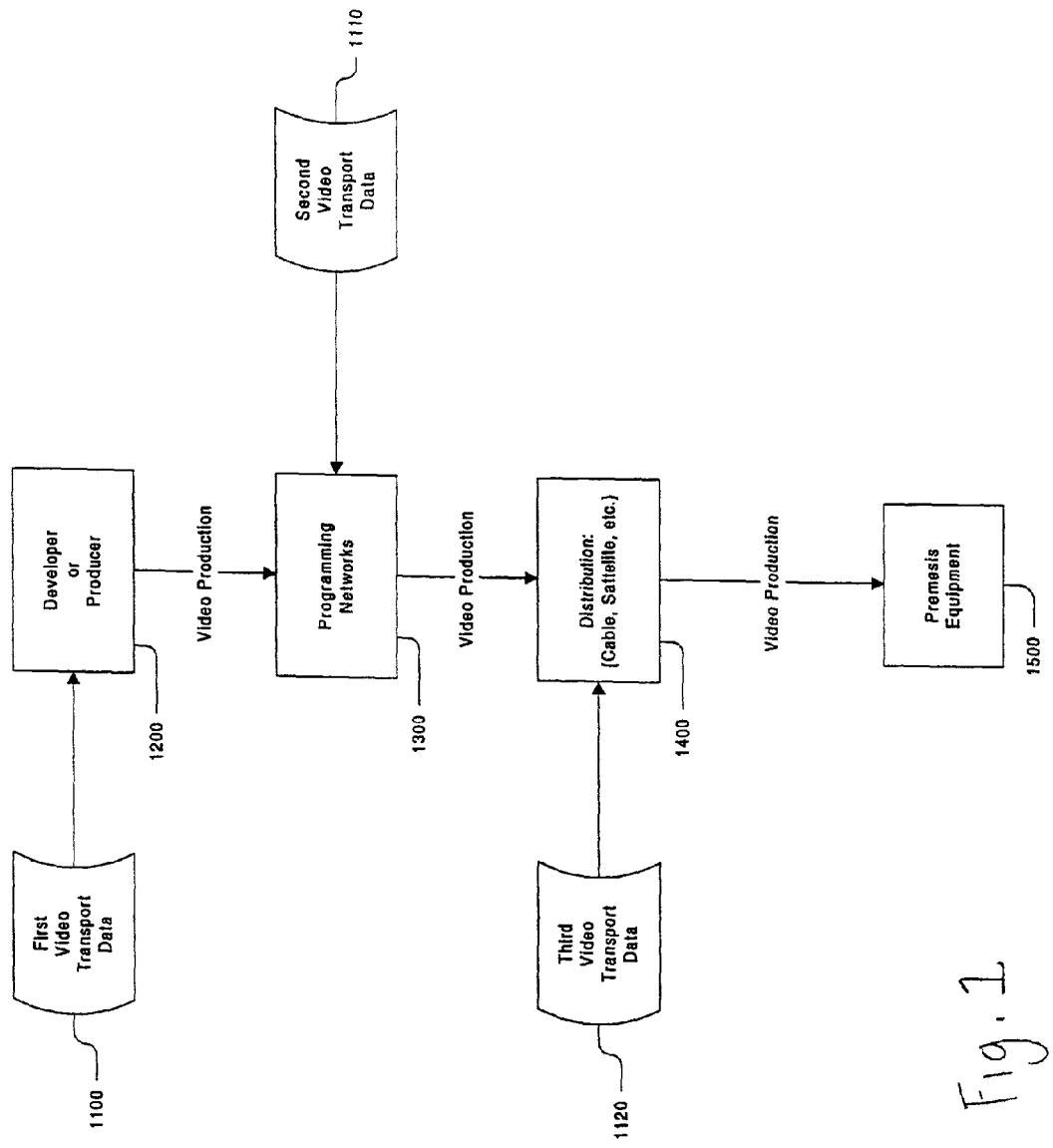
FIG. 1 depicts an enhanced video distribution hierarchy in which embodiments of the invention could be beneficially employed.

FIG. 1 depicts an enhanced video distribution hierarchy in which embodiments of the invention could be beneficially employed. Conventionally, a video production passes through the control several entities between creation and actual viewing. Each of these entities may desire to encode a video transport data stream in the video production. Moreover, each may desire to modify the video transport data stream previously encoded in the video production.

A video production developer or producer 1200 may initially encode a first video transport data stream 1100 at creation-time of the video production. When the video production moves down the distribution hierarchy, programming networks 1300 desire a second video transport data stream 1110 be encoded with the video production. The second video transport data stream 1100 could include modifications to the first video transport data stream 1100, additional video transport data, or deletions of selected portions of the first video transport data stream 1100.

From the programming networks 1200 the video production continues along the distribution hierarchy to a distribution point 1400. The distribution point 1400 represents a last controlling entity before the video production reaches the viewer's premises equipment 1500. The distribution point 1400, too, may desire that a third video transport data stream 1200 be encoded with the video production. The third video transport data stream 1120 could be a modification of the previously-encoded video transport data stream, include additional video transport data, or delete previously-encoded video transport data.

As depicted in FIG. 1, the developer or producer 1200 and the programming networks 1300 are upstream from the distribution point 1400. The particular entities and arrangement of the distribution hierarchy is not fundamental. Rather, a greater or lesser number of entities could exist. Further, features of the invention are not limited to operation in the context of a distribution hierarchy.

Embodiments of the invention could be used at any level of the distribution hierarchy, although particular benefits are obtained through use at or near the distribution point 1400. One illustrative embodiment involves an enhancing resource server system operator employing features of the invention at the distribution point 1400. In this embodiment, the operator could, on behalf of some or all upstream entities in the distribution hierarchy, manage the encoding video transport data. This frees the upstream entities form having to attend to encoding video transport data and provides the server system operator greater flexibility.

Still further, localization can be provided that would be impractical with conventional techniques. For instance, the programming networks 1200 can provide a generic video transport data stream which, at the distribution point 1400 in localities, can be translated to provide localized enhancing resources. For instance, a national advertiser could arrange for an advertisement to be run on a nationwide broadcast. The programming networks 1200 encode the generic video transport data stream. At the distribution point 1400 of each local affiliate of the programming network, the generic video transport data stream is transformed to provide, for instance, information related to the local outlets of the national advertiser.

Figure 2:
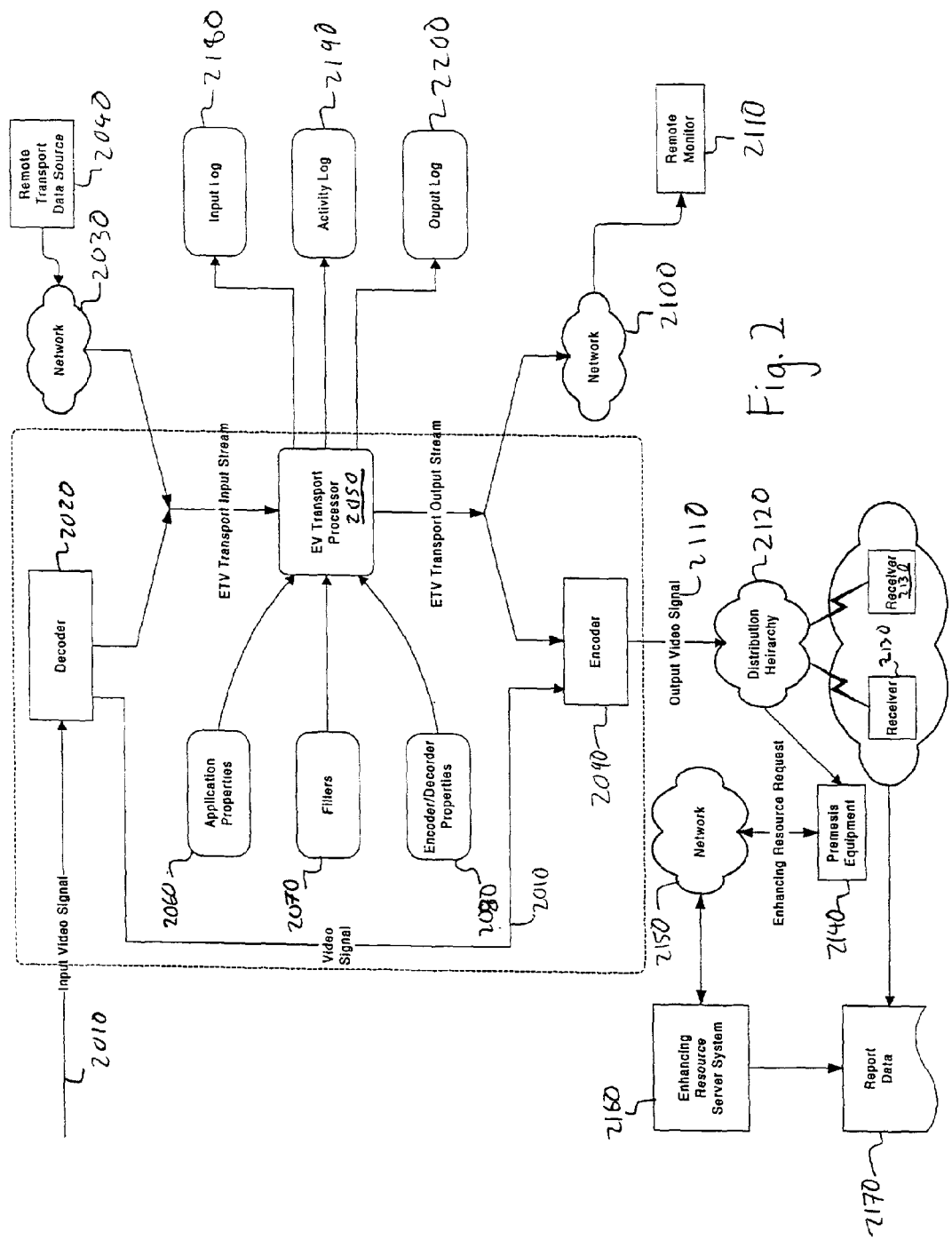
FIG. 2 depicts an operational process flow diagram.

FIG. 2 depicts an operational process flow diagram in an illustrative embodiment. Process flow initiates where a input video signal 2010 is received by a decoder 2020. The input video signal 2010 typically includes a video transport data stream encoded along with video data. This is not particularly important, however, and the input video signal 2010 could have no video transport data. When present, the video transport data stream need not be continuous throughout an entire video production and, rather, may start and stop a number of times.

The decoder 2020 decodes the video transport data stream from the input video signal 2010 when present. In some embodiments, the video transport data stream is encoded in line 21 channel 1 of the vertical blanking intervals of an NTSC television signal in accordance with Electronics Industry Association standards. See EIA-608, Recommended Practice for Line 21 Data Service; EIA-746A Proposal for Sending URLs over ERA 608 T2. Norpak TES encoder/decoders (Norpak Corporation, Kanata Ontario, Canada) and Text Grabber (SunBelt Industries Technologies Group, Inc., Jacksonville, Fla.) are suitable devices for VBI decoding.

In some embodiments, other video signal formats could be used if the video transport data stream is suitably encoded in the video signal. Suitable formats include, for instance, MPEG-based formats, a Serial Digital Video format, streaming video formats, PAL or SECAM, high definition television formats. It is contemplated that other formats could be used as well. Generally, whatever the format of the input video signal 2010, the decoder 2020 should have the ability to decode the video transport data stream when encoded therein. The decoder 2020 outputs the video transport data stream to enhanced video ("EV") transport processor 2050 (described below) and outputs the input video signal to a encoder 2090 (also described below).

A remote transport data source 2040 may also supply the video transport data stream across a first data network 2030. In some embodiments, the remote transport data source 2040 is a general purpose computer and the first data network 2030 includes a portion of the internet. Other hardware/software platforms available to one skilled in the field could be used for the remote transport data source 2040. Further the first data network 2030 could be either a public or private network, and use either the TCP/IP protocol suite or other protocols.

Central to process flow is the EV transport processor 2050. The EV transport processor 2050 receives the video transport data stream, for instance from the decoder 2020 or the remote transport data source 2040. The EV transport processor 2050 includes software executing on hardware for altering the video transport data stream to create a modified video transport data stream for encoding in the input video signal 2010 to form an output video signal 2110. In some embodiments, the EV transport processor 2050 is implemented as a collection of JAVA classes and operates in a Solaris operating environment on workstations for SUN Microsystems, although the platform-independence of JAVA allows flexibility with respect to operating environment. In other embodiments, the ETV transport processor 2050 could be implemented in a special-purpose hardware environment. It could be integrated in the same hardware platform as an encoder, a decoder, or both.

An application properties file 2060 includes global information about the runtime properties of the EV transport processor 2050. An encoder/decoder properties file 2080 includes information about the decoder 2020 and the encoder 2090 to be used in connection with transport translation. The information is for configuring the input and output streams of the encoder and decoder (respectively). The configuration format and values will typically vary with the particular decoder 2020 and encoder 2090 used. A conventional JAVA properties file could be used for application files 2060 and/or the encoder/decoder properties file 2080.

The EV transport processor 2050 also operates with a collection of filter rules 2070. The filter rules determine which video transport data units in the video transport data stream are altered in creating the modified video transport data stream. Members of the set of filter rules 2070 are generally of the form that if one or more conditions are satisfied, then action is taken with respect to a unit of the video transport data stream. In an illustrative embodiment, a condition is specified by a regular expression to which the unit of the video transport data stream matches. In this embodiment, actions available include:

(a) translating a unit matching a regular expression pattern into a string defined by a target pattern;

(b) allowing only those units of the video transport data stream matching the regular expression to be re-encoded to form the modified video transport data stream; and (c) allowing all but those units of the video transport data stream matching the regular expression to be re-encoded to form the modified video transport data streams.

Using conventional Perl regular expression syntax, see e.g., Jeffrey E. F. Friedl, Mastering Regular Expressions (O'Reilly & Assoc. 1997), in this illustrative embodiment, lines of the collection of filter rules should match to one of the following expressions:

| Expression | Indication |
| --- | --- |
| ^\s*(/.+\|.+)\s*$ | Tag |
| ^\s*\<.+\>\s*$ | Begin Tag |
| ^\s*\</.+\\\s*$ | End Tag |
| ^((\s*(//\|#).*\s*) \|\| (\s*))$ | Comment |
| ^\s*(allow\|allowonly\|allowgroup)\s+".+"\s*$ | Allow |
| ^\s*translate\s+\".+\"\s+to\s+\".+\"\s*$ | Translate |
| ^\s*(musthave\|always\|mandatory)\s+".+"\s*$ | Must have |
| ^\s*(mustnothave\|never\|forbidden)\s+".+"\s*$ | Must not have |

The general form of filter rules in this embodiment is:

```
version#
<trigger>
    [ translate "RE" to "literal" ] ...
    [ (musthave | always | mandatory) "RE" ]...
    [ mustnothave | never | forbidden) "RE" ]...
    [ (allow | allowonly | allowgroup) "RE"...
</trigger>...
```

Notationally, "RE" and "literal" are placeholders for a regular express, and a string literal, respectively. Elements with a trailing ellipsis ( . . . ), can occur any number of times. The angle-bracket tags are scope tags. The particular embodiment identified above indicates scope with "trigger" which in this instance, refers to an ATVEF trigger. The parentheses and alteration <e.g., (x|y|z), have their ordinary meaning with respect to scope. See Friedl. The semantics could vary and any number of scope identifiers could be used. "translate" "musthave" "always" "mandatory" "mustnothave" "never" "forbidden" are reserved keywords having their ordinary meaning.

It is not particularly fundamental that regular expressions be used, or that translations expand directly to a literal. One skilled in the art having the benefit of this disclosure will appreciate many possible variations on the above illustrative filter rule format also within the scope and spirit of the present invention. Further, the above syntax is merely illustrative; many others could be used. In some embodiments, the condition portion could have multiple components, could be based on scoring. In other embodiments, the condition portion could be based on date and/or time criteria: for instance all enhanced video transport data could be filtered out during a particular time window or all enhanced video transport data could be left unmodified during a particular time window. More generally, other mechanisms available to one skilled in the art could be also used for controlling selective modification of the video transport data stream.

By way of illustration, in connection with the above illustrative embodiment, several examples are provided below:
Example (1) allow example:
<trigger>
    allowonly "^.*\.respondtv\.com"
    allowonly "^.*\.weather\.com"
<trigger>
This filter rule denies all triggers except for those explicitly allowed. The result is that only respontv.com and weather.com will be allowed; all others are rejected.
Example (2) deny example:
<trigger>
    never "^.*\.msnbc\.com"
    never "^.*\ weather\.com:
</trigger>
This trigger filter allows all triggers except those explicitly denied. The result is that msnbc.com and weather.com are denied; all others are allowed.
Example (3) Enforced presence example
<trigger>
    musthave http://
    always "\.com"
    mandatory "v:t"
</trigger>
This trigger filter use the synonyms musthave, always, and mandatory. The result is that triggers must contain http://, .com, v:t. All others are denied.
Example (4) Translation example.
<trigger>
    translate "itv.weather.com.*>" to "etv.respondtv.com/c/bloomberg05/>"
</trigger>
This trigger filter will translate portions of URLs from itv.weather.com to etv.respondtv.com. The result is that URLs containing itv.weather.com will be replaced with etc.respondtv.com/c/bloomberg05/.
Example (5) Insertion example.
<trigger>
    translate ">" to ">[nid:1234]"
</trigger>
This trigger filter will insert attribute after a URL (ending in >) in a trigger. The result is that a network identifier (nid: 1234) attribute is inserted after the URL.

No particular order of evaluation of filter rules is required. Evaluation order can vary. In some embodiments, rule evaluation takes place in the order of the general filter above, i.e., (1) translations (2) 'musthaves' (3) 'mustnothaves', and (4) 'allowonlys'. Conveniently when any filter rule denies a particular regular expression, remaining rules need not be evaluated. Further, 'allowonly' filter rules could be grouped and evaluated as a group. If no regular expression of the 'allowonly' group is matched, then that data unit may be discarded.

In some circumstanced, e.g. ATVEF transport A, units of the video transport data may include a checksum. In some embodiments when an invalid checksum is detected the associated unit of video transport data is discarded. When modifying units of video transport data that have an associated checksum, the checksum is modified to appropriately reflect the modified video transport data.

When processing the video transport data stream, the EV transport processor 2050 generates logs. An input log 2180 records the unmodified video transport data stream. An output log 2200 records the modified video transport data stream. An activity log 2190 records arrival of video transport data as well as the alterations performed to the modified video transport data stream through operation of the filter rules.

The EV transport processor 2050 outputs the modified video transport data stream to the encoder 2090. The encoder 2090 creates an output video signal 2110 by encoding the modified video transport data stream in the input video signal 2010. In some embodiments, the encoder 2090 and the decoder 2020 are integrated in the same hardware unit.

The EV transport processor 2050 can also provide an output of the modified video transport data stream to a network device. A remote monitor 2110 may then be used to monitor the modified video transport data stream from across a second data network 2100. The first data network 2030 and the second data network 2100 may be interconnected and could be the same network. In some embodiments, the remote monitor 2110 can retrieve the input log 2180, the activity log 2190, and/or the output log 2200.

Still further, in some embodiments the EV transport processor 2050 output units of video transport data to achieve a desired presentation. For instance, when a unit of video transport data includes an ATVEF Transport A trigger, it can be expected that some of the current generation of user-agents will present the URL in the trigger on the viewer's display upon receipt of the trigger. Some of the current generation of user-agents have a 32 character horizontal display. To present URLs in a form more conducive to presentation in such environments, in some embodiments the EV transport processor 2050 encodes non-printing characters in URLs to force the URL to wrap to such 32 character displays. This achieves a displayed presentation of the trigger URL to viewers with user-agents of the above-mentioned type with a more "user-friendly" presentation.

Features of the invention are not limited to operation with one video transport data stream or one video signal. In some embodiments, the EV transport processor 2050 could receive more than one video transport data stream and/or more than one video signal. For instance, plural video signals could be simultaneously processed with an EV transport processor 2050. Further, plural channels in a single video signal could be simultaneously processed with one EV transport processor 2050; additionally, each of the plural channels could be received as a separate video signal and the plural video signals processed simultaneously as mentioned above. Each of plural video signals (or channels in a single video signal) could have a corresponding video transport data stream encoded within. Further, a single video transport data stream could be received by the EV transport processor 2050 for processing and then be encoded in plural output video signals. Still further, the video transport data streams could be combined and encoded in one (or more) output video signal. The examples given are illustrative, one skilled in the art having the benefit of this disclosure will appreciate modifications, permutations, and adaptations of the examples and these are also within the scope and spirit of the present invention.

Figure 3:
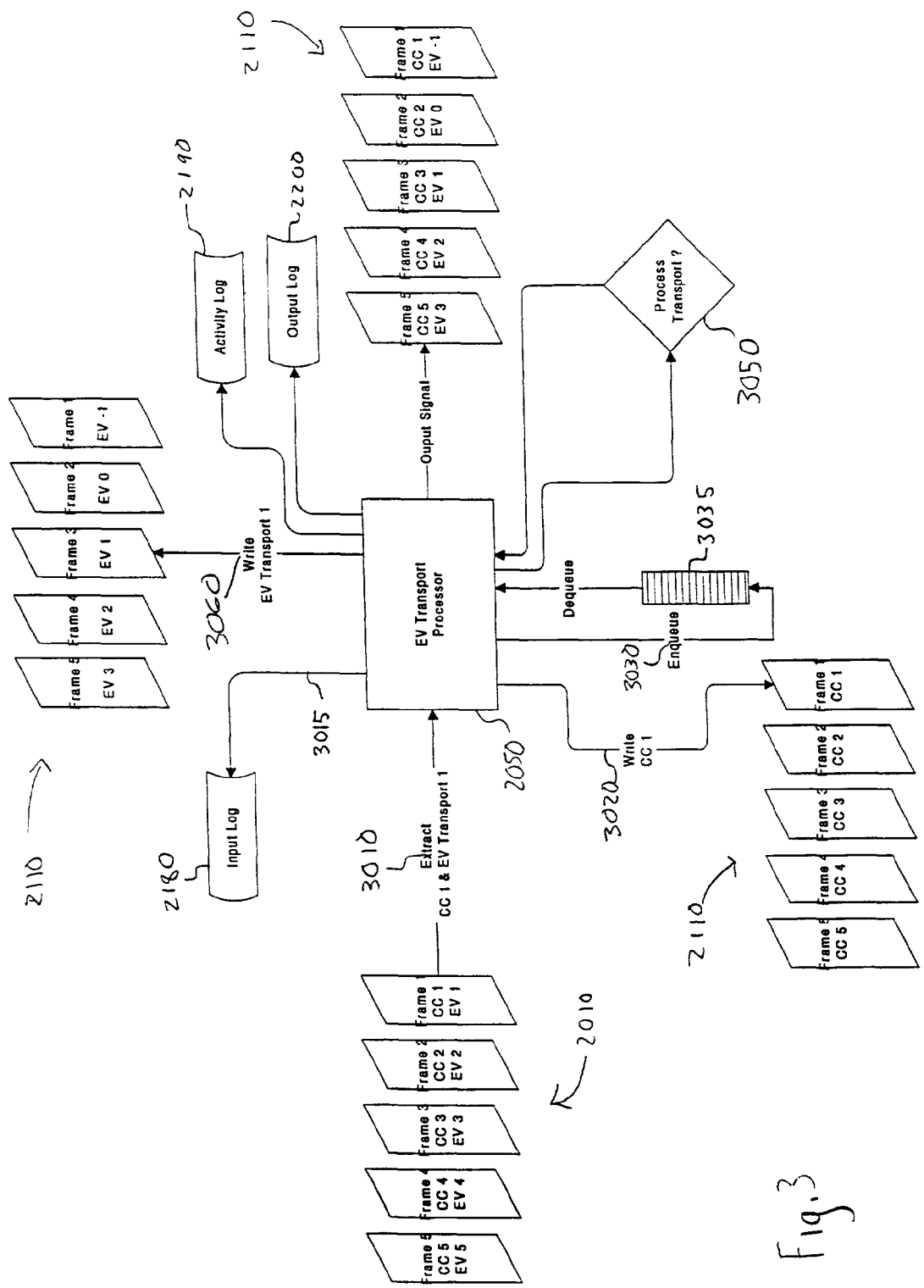
FIG. 3 depicts concurrent handling of closed captioning data in connection with translation of the video transport data streams.

FIG. 3 depicts concurrent handling of closed captioning data in connection with translation of the video transport data stream in an illustrative embodiment. As noted above, in some embodiments, the video transport data stream is encoded in the vertical blanking interval of an NTSC video signal. Closed captioning information is also commonly encoded in the vertical blanking interval. Certain encoder/decoders operate in a manner such that all data in the vertical blanking interval is rewritten. When a video signal has both closed captioning ("CC") and video transport data, processing of the video transport data could introduce latency which would destroy synchronization between the underlying video images and the CC data accompanying those images.

Concurrent handling of both CC data and video transport data is accomplished as shown in connection with FIG. 3.

Illustratively, the input video signal 2010 is shown as being made up of several "frames," i.e., time-based elements. As shown in FIG. 3, the input video signal 2010 includes CC data and video transport data indexed by the same time element as the frame with which they are associated. For instance, Frame 2, CC2, EV2. Notationally, when discussing FIG. 3, reference will be made to, for instance, CC1 or EV4, to indicate the frame of the input video signal 2010 from which the CC or EV data was extracted.

Process flow initiates where the decoder 2020 (not shown) extracts CC1 and EV1 3010. The EV transport processor 2050 promptly writes EV1 3015 to the input log 2180. The EV transport processor 2050 then writes CC1 3020 to the output video signal 2110 and to the output log 2200. The EV processor 2050 then enqueues 3030 EV1 in a queue 3035.

The EV processor 2050 dequeues video transport data from the queue 3035. Next the collection of filter rules 2070 are applied to EV1 in a process transport step 3050. The EV transport processor 2050 then encodes EV1 3060 (possibly modified by the filter rules) into the output video signal 2110. It will be appreciated that, as illustrated in FIG. 3, EV1 is encoded in Frame 3 of the output video signal 2110, reflecting that passage of time in the queue 3035 and during the process transport step 3050. The output log 2200 records the modified video transport data stream and the activity log 2190 records the alteration affected in connection with the process transport step 3050.

One particularly beneficial application of the present invention enables the monitoring of the distribution of enhancing resources in connection with a video production. As noted above in connection with FIG. 1, a video production may pass through the control of several entities before ultimate distribution. At each point in the distribution hierarchy, the controlling entity has the opportunity to alter the video transport data. These alterations may not be authorized in all instances and it would be desirable for a system to exist that allowed for the monitoring of unauthorized alteration of video transport data. Still further certain entities, for instance, advertisers, typically pay broadcasters to provide their content (video and/or enhancing resources) to consumers. It would be desirable for such entities to have means to monitor the actual distribution to consumers of video transport data for the enhancements.

An application of the present invention can provide these features. Returning to FIG. 2, a network of receivers 2130 can be placed at the end of the distribution hierarchy 2120. The receivers 2130 monitor the modified video transport data stream and log the video transport data. The receivers 2130 could be placed around in any geographic regions of interest.

The EV transport processor 2050 is used on behalf of, for instance, an advertiser to include identifiers in the modified video transport data stream. The identifiers could be of a particular video program, of enhancements desired to accompany the video program. The identifiers could be encoded, for instance, as attributes to ATVEF Transport A URLs, as ATVEF Transport B data, or in other formats. The receivers 2130 monitor the output video signal 2110 at the time of distribution, e.g. broadcast. The receivers 2130 detect and log the presence of the identifiers (or implicitly detect their absence). The log data is then provided to generate report data 2170 of the distribution of the advertiser's video program and/or accompanying enhancements.

The above-described application can provide still further beneficial information. In addition to the receivers 2130 the output video signal is received by enhanced video equipment at users' premises 2140. When the user requests enhancing resources, requests are submitted to an enhancing resource server system 2160 across a response network 2150. The requests received by the enhancing resource server system 2160 can also be used to create the report data 2170. Thus it will be appreciated that the receivers 2130 contribute information about the distribution of enhancements, while the enhancing resource server system 2160 contributes information about the actual requests for the enhancing resources that are made.

Yet another application of the present invention can be found in connection with the invention entitled "Method, Apparatus and System for Overlapping Enhancement Control" filed concurrently herewith by attachment hereto. In some embodiments, operation in connection with overlapping enhancement control is achieved as follows. The EV transport processor 2050 creates a modified video transport data stream that includes ATVEF triggers. The trigger URLs in the triggers are the same. The EV transport processor 2050 also creates a LOAD directive in the SCRIPT field of the triggers in the modified video transport data stream. The URL attribute of the LOAD directive is to a next (in time) enhancing resource.

Although the present invention has been described in terms of features illustrative embodiments, one skilled in the art will understand that various modifications and alterations may be made without departing from the scope of the invention. Accordingly, the scope of the invention is not to be limited to the particular embodiments discussed herein, but should be defined only by the allowed claims and equivalents thereof.

ANNEX A

Method, Apparatus, and System for Overlapping Enhancement Control

BACKGROUND

A complex problem arises in connection with enhanced video: where a trigger comes through while an enhancement is already being displayed, how should that trigger (and its associated enhancement) be handled?

This problem could arise, for instance, where a show is enhanced, and an embedded ad is also enhanced; a show is enhanced in two places, and a viewer is still in the first enhancement when the second trigger arrives; two ads are enhanced, and a viewer is still in the first ad's enhancements when the second trigger arrives.

Conventionally, when one encodes triggers, client systems—for instance set-top boxes manufactured under license from WEBTV Networks, or Liberate Technologies—provide no effective control of overlapping enhancements. Some conventional client systems completely ignore the second trigger; this is undesirable for the sponsor of the second trigger as well as the programmer who sold that trigger spot. In other conventional client systems, if the new trigger does not contain the same URL as the currently displayed screen (which is not necessarily the URL in the old trigger), the new trigger pops up and the viewer has 10 seconds to choose the new trigger over the old enhancement. While this approach may better accommodate sponsors, it is inflexibly disruptive to the viewers. Still further, it also has problems where copies of the same trigger can disrupt subsequent screens of the first trigger's enhancements.

It would be desirable for a solution to exist which allowed for flexible control of overlapping enhancements. Still further it would be desirable for such a solution to be able to flexibly allow for overlapping enhancement control to be varied based on broadcast context. For instance, it would be desirable for a solution to exist for different broadcasters to specify how overlapping enhancements would be handled, and a similar pair of overlapping enhancements handled in accordance with the broadcasters' specifications.

DESCRIPTION

Trigger-Script Scheduling

A solution to the above-described and other problems is obtained by a method, apparatus, and system for overlapping enhancement control. In some embodiments overlapping enhancement control can be obtained using the script field in ATVEF triggers. In keeping with the ATVEF specification, if a trigger comes through with the same URL as the enhanced screen currently being displayed, then the contents of the Script field of the trigger executes immediately.

With this aspect of the ATVEF specification, a trigger can provide a directive to an enhanced screen to wrap itself up through the Script field. To implement overlapping enhancement control in this way, all screens in a set of enhanced screens should have the same URL (even while viewers are navigating through screens), or more particularly, that all triggers on the same channel have the same URL. In some embodiments, this is obtained through having all enhancement campaigns display as a frame inside a single frameset document. That frameset document is also a convenient place to put the JavaScript methods which the trigger fields invoke.

In an illustrative example, a frameset document with the JavaScript methods is called /x.html. The single frame in the frameset starts off being filled with the URL tv:. However, it also has a "load" method which will load a different URL into the frame.

Then the first trigger URL would be, for instance, http://etv.respondtv.com/x.html with a script field load ("/c/seta"), and the second trigger would also be URL http://etv.respondtv.com/x.html but with a script field of load ("/c/setb").

This load method, could be jarring to the viewer, who may be in the middle of filling out a form when the second set of screens abruptly starts. The viewer could press the BACK button to resume the previous set of enhancements, but this may not be appealing to the viewer. To help prevent the jarring effect, one aspect could involve a method that performs a different function, for instance a warning function, to give the viewer an explicit choice. For example the viewer could be warned that a new enhancement would be available and the viewer could be given a choice between ignoring the second trigger and staying with the current enhancements, saving the current session and proceeding to the second trigger, wrapping up the current enhancements and proceeding to the second trigger, or waiting until after the current interaction is done to proceed to the second trigger. An informational message could be provided in connection with the transition between successive sets of enhancements. For example, the viewer could be provided a message to the effect "the time period for the current television enhancements is about to end, and new enhancements called '[description]' are about to start." For this behavior, the second trigger would be the same URL with a script field of warn ("[description]"). Such an informational message screen or overlay preferably would also include the video broadcast as well.

Features of the invention can operate in connection with Enhancement Transport Alteration. For instance, if a trigger were to come through with URL: http://etv.respondtv.com/c/dominos04/ it could be translated on the fly to URL http://etv.respond.com/x.html with script field load ("/c/dominos04/"). This could further work in connection with translating a trigger URL http://tv.nissan.com/foo.html to the x.html URL with script field load (http://tv.nissan.com/foo.html).

Additionally, in different broadcast contexts, the same URL could be translated as above with different directives in the script field. One having the benefit of this disclosure will appreciate that this would allow flexibility and convenience on the part of programmers and members of the distribution hierarchy. For instance, an advertiser could encode a single series of triggers in an advertisement. Enhancement transport alterations systems in various locations and/or for various broadcasters could translate, on the fly, the single series of triggers to be presented in the particular context desired. When the advertisement enhancements occur in connection with a program in which the advertisement was embedded, control can be ceded (or not) in the manner desired in the particular context, by suitably programming JavaScript methods and translating the script field to include calls of the JavaScript method.

For instance, a button could be placed on the screen allowing for control to be ceded to the second enhancement by clicking for one broadcaster. A different broadcaster could desire that a warning message as described above be given. A still different broadcaster could also desire that a warning message be given but, for instance, a different message, for a different duration, etc. Still further, in different broadcast contexts, the second enhancement could be limited to different portions of the screen depending on the requirements of the particular broadcaster.

An alternative to the above-described embodiments that employ trigger-script field based is timeout-based scheduling. Timeout based scheduling involves each set of enhanced screens having access to information about when the next set is due; each set of enhanced screens would be responsible for either completing or transitioning to the next set in time. Timeout based scheduling could be implemented if the server knew exactly when each set should start by building the timeout into the pages it serves. It is likely impractical for the server to know so much about the schedule, however. Instead, the programmer could encode the timeouts at the last minute into the triggers. E.G., suppose a second set of enhancements ("setb") should start exactly 5 minutes (300 seconds) after a first set of enhancements ("seta"), and the Programmer has a program management system which knows this. Set A's trigger URL could be: <http://host.com/c/seta/?timeout=300&next=/c/setb/> and the first set of enhancements can use JavaScript to get the timeout and next URL.

Trigger-script field based scheduling is well-suited for live events, where the start time for a second set of enhancements may not be known when a first set of enhancements starts. With trigger-script scheduling, the broadcaster could have a mix of triggers inserted by the program management system as well as triggers from tape.

Many variations are possible, and one skilled in the art, having the benefit of this disclosure will appreciate modifications, permutations, adaptations, extensions, and alterations of the present of the foregoing that are also within the scope and spirit of the present invention.

What is claimed is:

1. A computer-controlled method of selectively encoding video transport data comprising:
    receiving a video signal;
    receiving a data stream comprising data corresponding to a trigger used for requesting a first resource available through a data network;
    selectively modifying said trigger in said data stream by translating said data of said trigger into data that is used for requesting a resource corresponding to said first resource, wherein said translation occurs in view of a device that will receive said translated trigger as to form a modified data stream and said translation converts location information of said first resource in said trigger into a different uniform resource locator address format used by said device, and further wherein said selective modification is performed such that at least one of: (i) all triggers are filtered out of said data stream during a first time window, and (ii) all triggers are left unmodified in said data stream during a second time window; and
    combining said modified data stream with said video signal, forming an outputted data stream.

2. The method of claim 1 wherein said video signal comprises said data stream.

3. The method of claim 2 wherein said video signal further comprises closed captioning information.

4. The method of claim 3 further comprising:
    extracting said closed caption information from said video signal;
    extracting said data stream; and
    reencoding said closed captioning information in said video signal in near real-time for retaining synchronization of said closed caption information and said video signal.

5. The method of claim 2 wherein said video signal comprises a vertical blanking interval and wherein data stream is encoded in said vertical blanking interval.

6. The method of claim 2 wherein said video signal is encoded in an MPEG format.

7. The method of claim 2 wherein said video signal is encoded in a Serial Digital Video format.

8. The method of claim 2 wherein said video signal is encoded as a Synchronized Multimedia Integration Language presentation.

9. The method of claim 1 wherein said device is capable of requesting said corresponding resource.

10. The method of claim 1 wherein receiving said stream of video transport data comprises, receiving a stream of data across said data network from a remote source.

11. The method of claim 10 wherein said data network comprises a portion of the Internet.

12. The method of claim 1 wherein selectively modifying said data stream comprises:
    detecting a first data unit in said data stream;
    examining a rule having a condition portion and an action portion, for determining whether said first data unit satisfies said condition portion, and
    executing said action portion of said rule for modifying said data stream.

13. The method of claim 12 wherein said first data unit comprises a URL.

14. The method of claim 12 wherein said first data unit comprises attribute associated with a URL.

15. The method of claim 12 wherein said data unit comprises ATVEF Transport B data.

16. The method of claim 1 wherein said data stream is of an ATVEF Transport B type.

17. The method of claim 1 wherein receiving a video signal comprises receiving a first video signal from a first source, the method further comprising:
    receiving a second video signal from a different source; and
    wherein combining said modified data stream with said video signal, forming said outputted data stream comprises:
        combining said modified data stream with said first video signal and with said second video signal.

18. The method of claim 1:
wherein said receiving a video signal comprises receiving a first video signal and a second video signal, wherein each video signal is from a different source;
wherein receiving data stream comprises receiving a first video transport data stream and a second video transport data stream;
wherein selectively modifying said data stream, forming a modified transport data stream comprising
selectively modifying said first and second video transport data streams, respectively forming first and second modified video transport data stream; and
wherein combining said modified data stream with said video signal comprises:
combining said first modified video transport data stream with said first video signal and combining said second modified video transport data stream with said second video signal as to form said outputted data stream.

19. The method of claim 1 wherein said video signal comprises a plurality of channel, each of said plurality of channels having associated video transport data in said video transport data stream and wherein selectively modifying said data stream, forming a modified video transport data stream comprises selectively modifying said video transport data stream on a per-channel basis.

20. The method of claim 12 wherein executing said action portion comprises one of:
allowing said first video transport data unit to be encoded in said modified data stream;
preventing said first video transport unit from being encoded in said modified data stream; and
encoding a second video transport data unit in lieu of said first video transport data unit.

21. The method of claim 1 further comprising providing said modified data stream to a remote monitoring client system.

22. The method of claim 1 wherein selectively modifying said data stream comprises inserting an identifier of a video program enhancement, and further comprising:
receiving said video signal at a plurality a receiving locations; and
detecting said identifier one or more of said plurality of receiving locations.

23. The method of claim 22 further comprising:
receiving first information respecting said one or more of said plurality of receiver locations detecting said identifier; and
preparing summary information regarding provision of said video program enhancement responsive to said first information.

24. The method of claim 1 wherein selectively modifying said stream of data comprising inserting an identifier of a video program enhancement obtained from said first resource and further comprising
receiving an HTTP request for said video program enhancement, said HTTP request comprising said identifier; and
preparing summary information regarding provision of said video program enhancement responsive to said HTTP request.

25. The method of claim 22 further comprising:
receiving an HTTP request for video enhancements, said HTTP request comprising said identifier, and
preparing summary information regarding provision of said video program responsive to said first information and said HTTP request.

26. A computer-controlled enhancement video transport data modification system comprising:
an encoder for encoding a modified video transport data stream in an output video signal;
a video transport data modification processor operatively coupled with said encoder, and an input, said video transport data modification processor configured for receiving a video transport data stream, comprising a trigger which corresponds to data used for requesting a first resource available through a data network, from said input and selectively modifying said video transport data stream for creating said modified video transport data stream by translating said trigger into data that is used for requesting a resource corresponding to said first resource, wherein said modification is performed in view of a device that will receive said modified video transport data stream and said translation converts location information of said first resource in said trigger into a different uniform resource locator address format used by said device, and further wherein said selective modification of said video transport data stream is performed such that at least one of: (i) all triggers are filtered out of said video transport data stream during a first time window, and (ii) all triggers are left unmodified in said video transport data stream during a second time window.

27. The system of claim 26 further comprising a decoder for receiving an input video signal, said input video signal comprising said video transport data stream, said decoder configured for extracting said video transport data stream.

28. The system of claim 26 wherein said output video signal comprises a plurality of channels, and wherein said encoder encodes said modified video transport data stream in each of said plurality of channels.

29. The system of claim 26:
wherein said video transport modification processor is configured for selectively modifying first and second video transport data streams respectively associated with said first and second video signals, wherein said first and second video signals are from different sources; and
wherein said encoder is configured for encoding said first video transport data stream in said first video signal and encoding said second video transport data stream in said second video signal.

30. The system of claim 27 wherein said video signal comprises a plurality of channels, each of said plurality of channels having associated video transport data in said video transport data stream and wherein said video transport data modification processor is selectively modifying said video transport data stream of a per-channel basis.

31. The system of claim 26 wherein said video transport data modification processor comprises:
a set of rules, members of said set of rules having a condition portion and an action portion; and
a pattern matching module, said pattern matching module identifying whether a video transport data unit in said video transport data stream matches said condition portions of members of said set of rules.

32. The system of claim 31 wherein said video transport data unit comprises a URL corresponding to said first resource.

33. The system of claim 31 wherein said video transport data unit comprises an attribute of a URL corresponding to said first resource.

34. The system of claim 31 wherein said video transport data unit comprises ATVEF Transport B data.

35. The system of claim 26 wherein said encoder encodes identifiers of a video program enhancement and further comprising:

a receiver network, said receiver network is configured for detecting said identifiers in a broadcast of output video signal.

36. The system of claim 26 wherein said encoder encodes identifiers of a video program enhancement and further comprising:

a server system, said server system configured for receiving a request for a resource associated with an identifier in said modified video transport data stream, wherein said request comprises one of said identifiers.

37. The system of claim 31 further comprising a data processing system for generating summary reports responsive to receiving said identifiers.

38. The system of claim 26 further comprising a computer system, said computer system configured for providing a video transport data stream to said input across said data network.

39. The system of claim 26 further comprising:

an output for providing said video transport data stream to said data network; and a monitoring computer system, said monitoring computer system configured for receiving said modified video transport data stream across said data network.

* * * * *